Aug. 2, 1932.  J. T. TRUMBLE  1,869,787
SUPERCHARGER
Filed Sept. 19, 1927  6 Sheets-Sheet 1
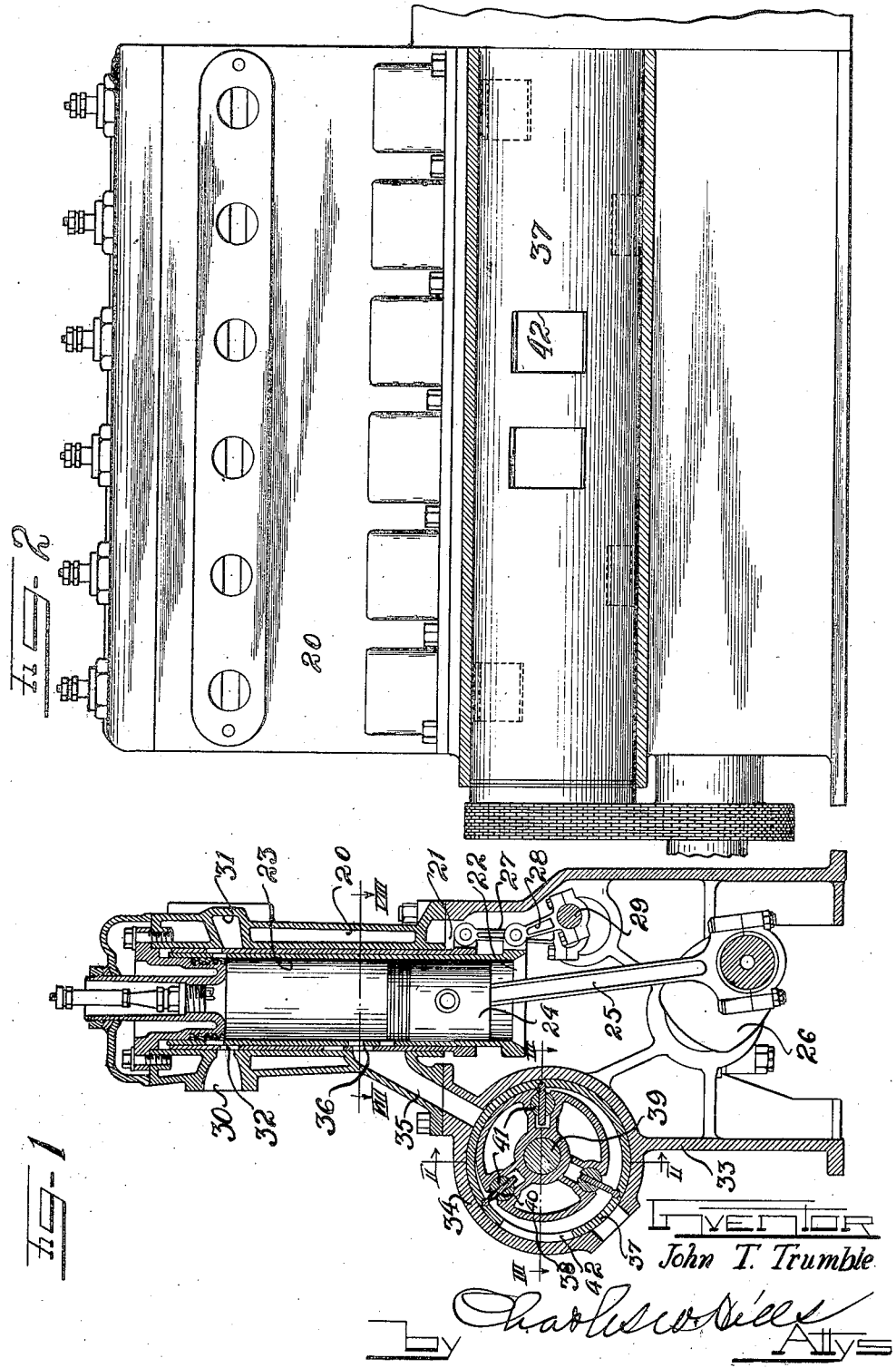

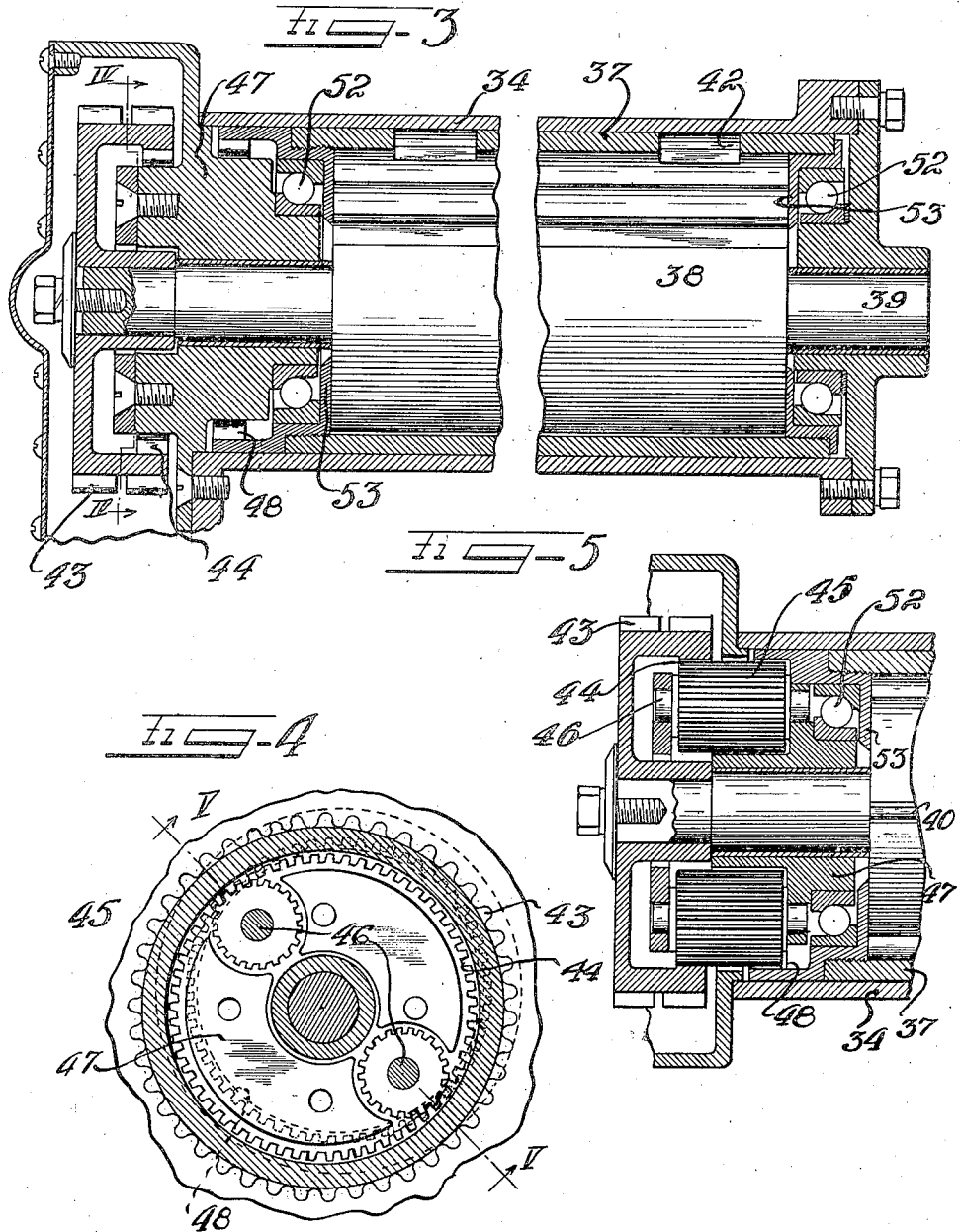

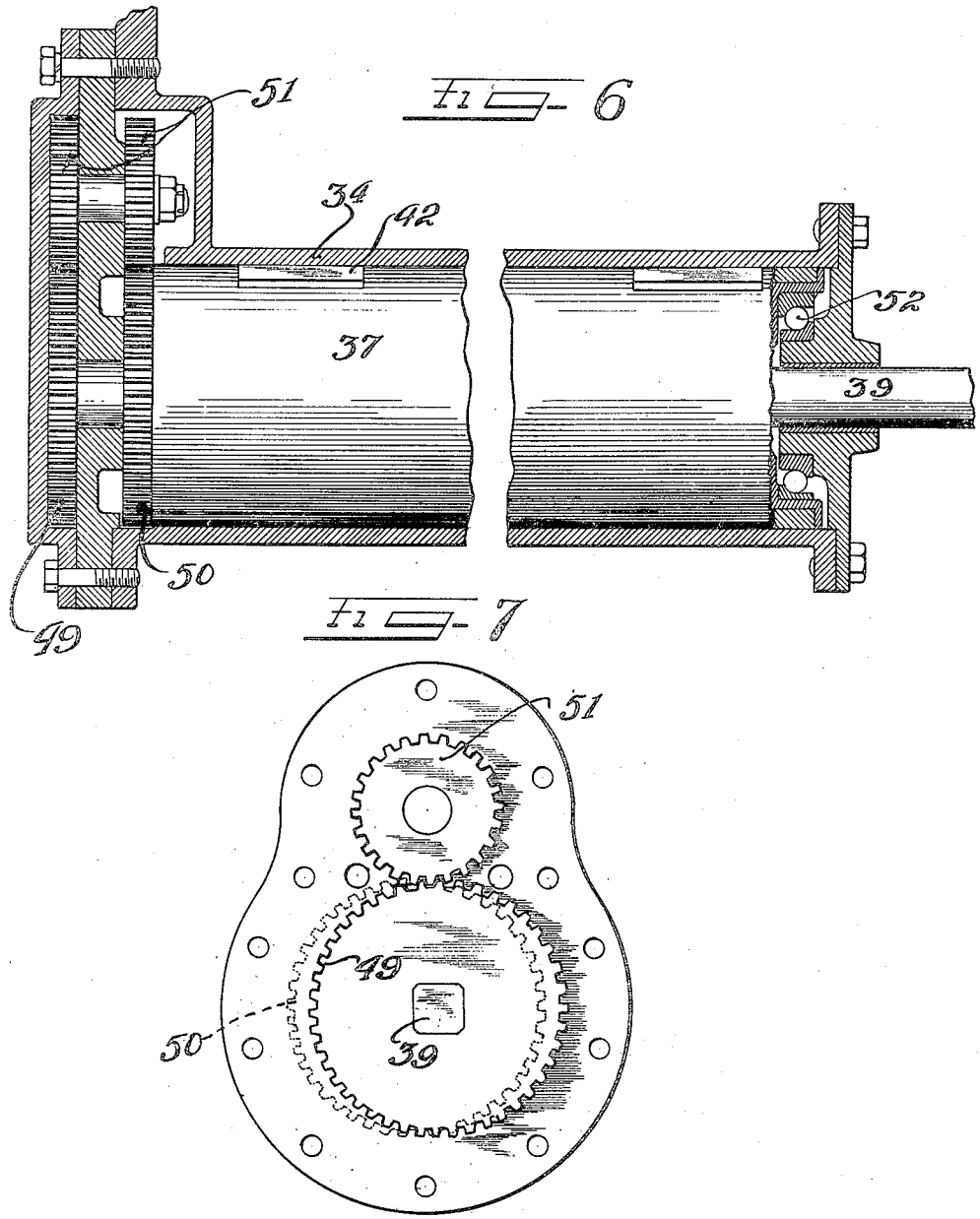

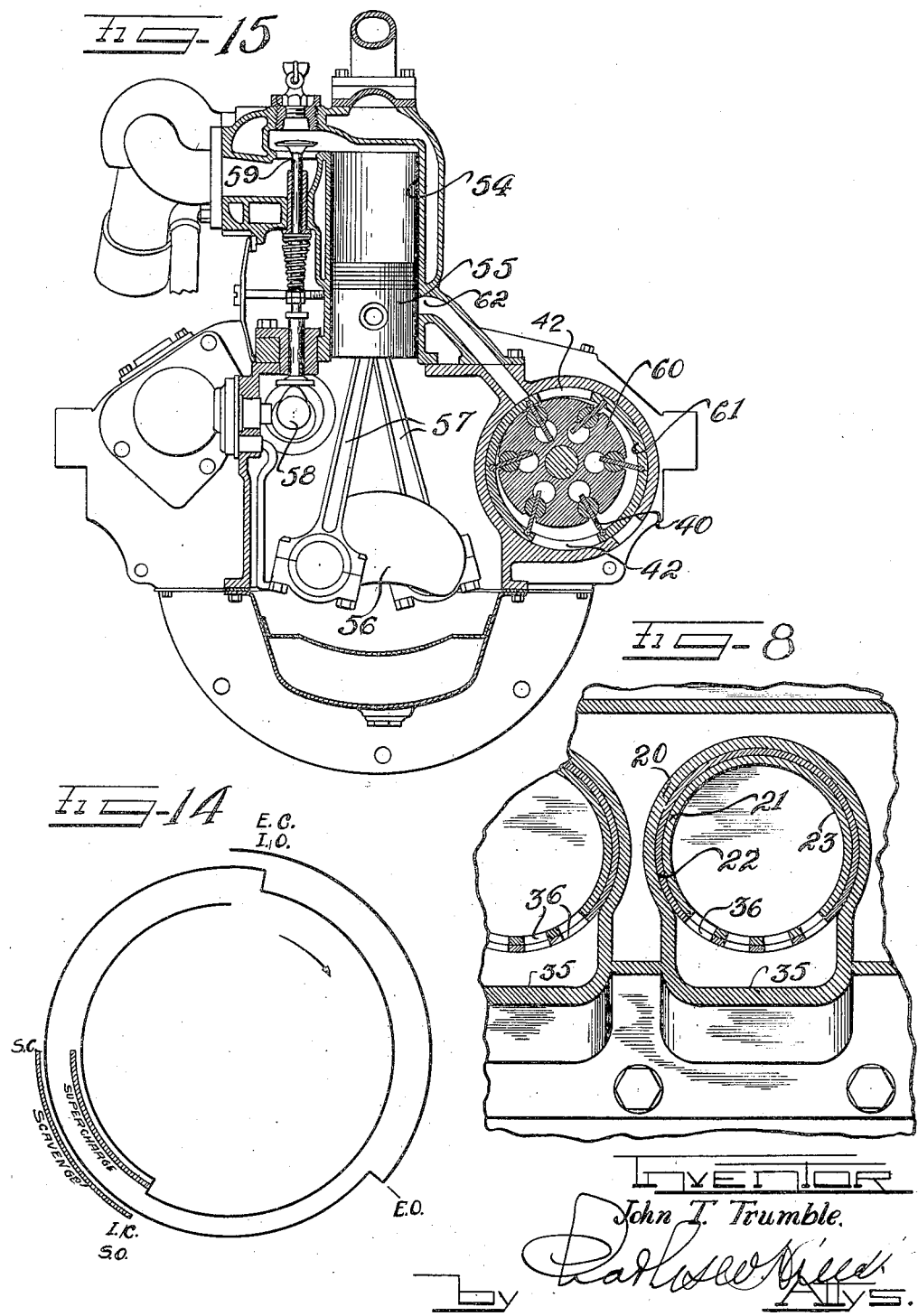

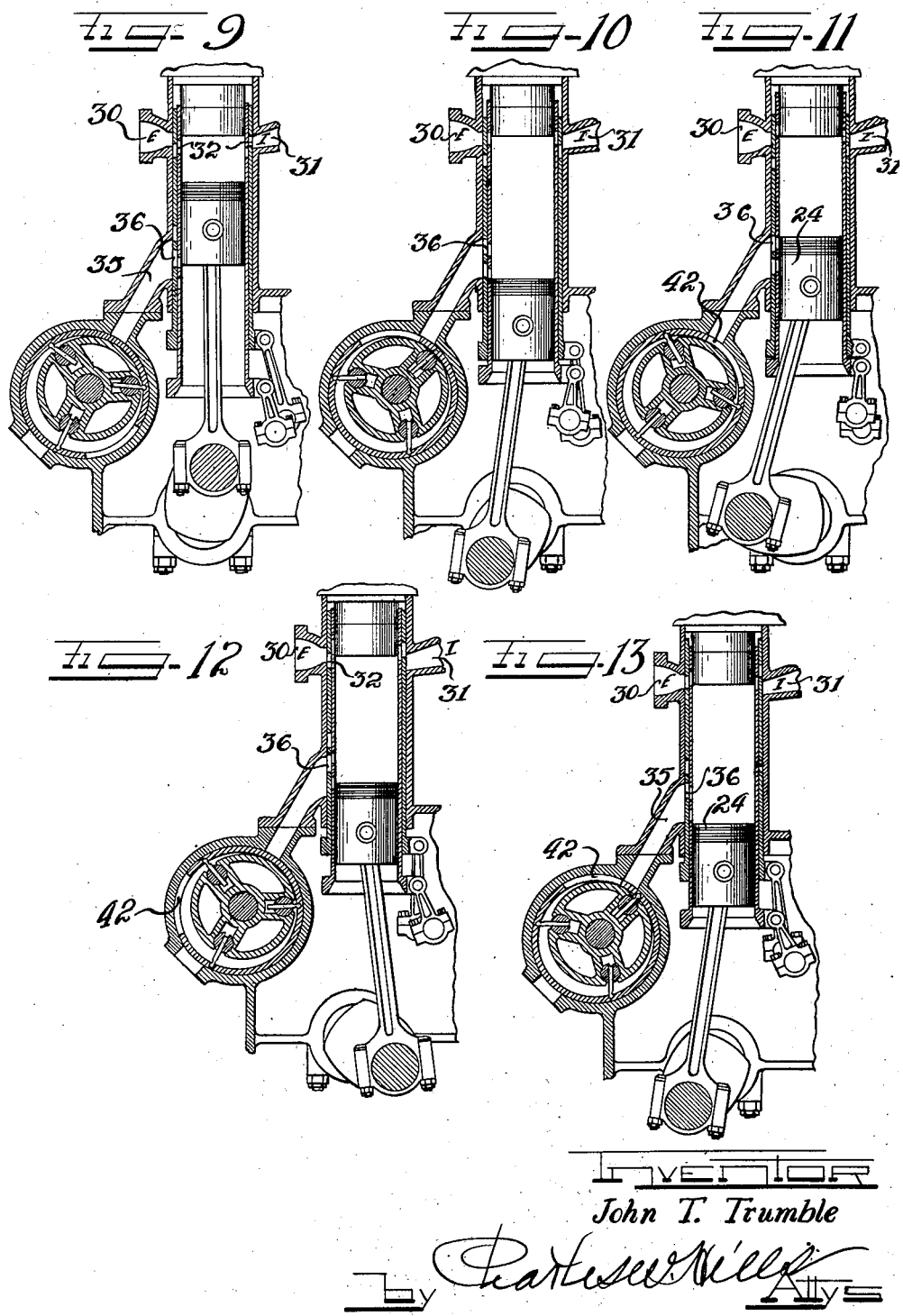

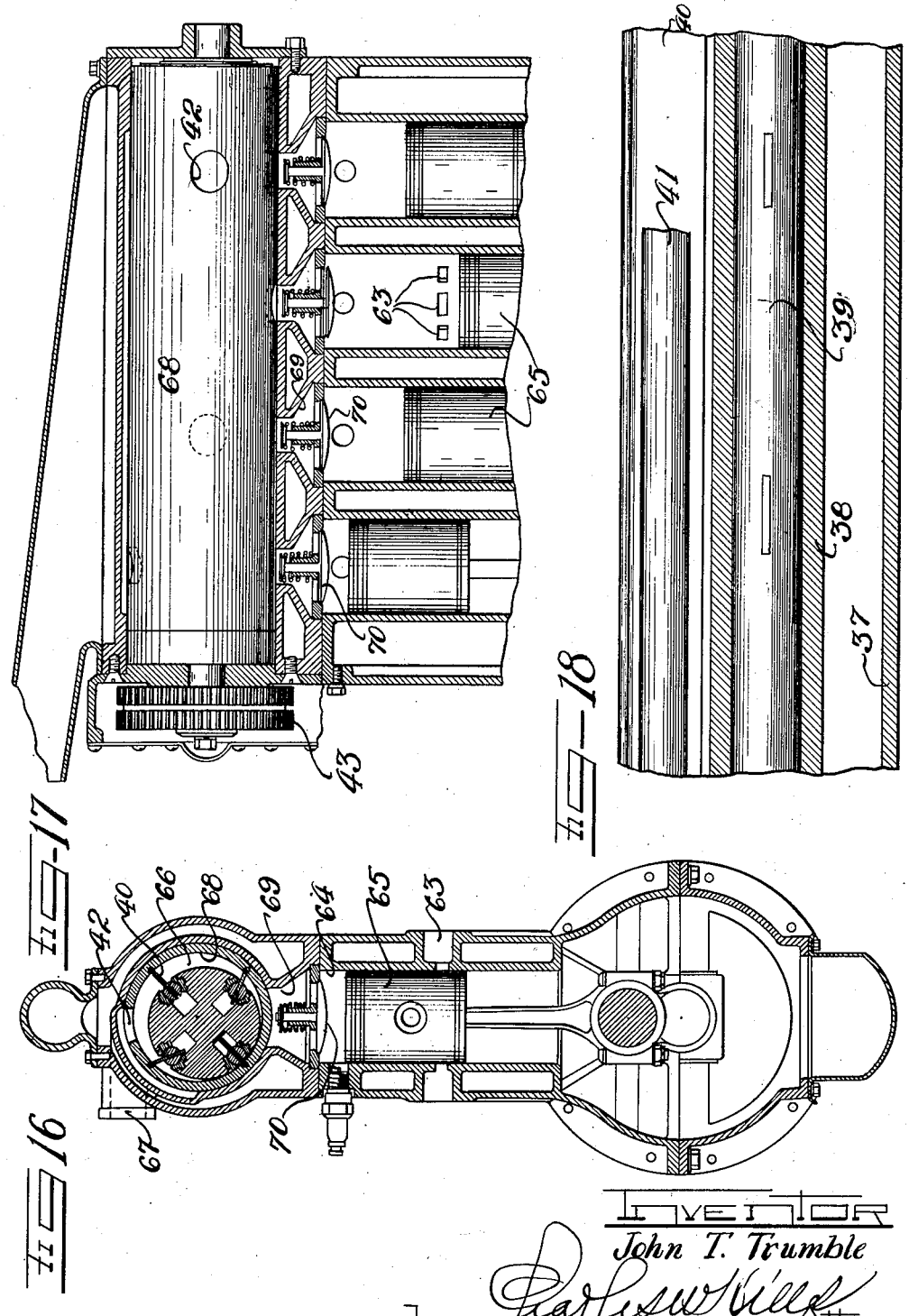

Patented Aug. 2, 1932

1,869,787

UNITED STATES PATENT OFFICE

JOHN T. TRUMBLE, OF LANSING, MICHIGAN

SUPERCHARGER

Application filed September 19, 1927. Serial No. 220,586.

This invention relates to supercharging internal cambustion engines to increase the power thereof by increasing the volume of charge supplied thereto.

I am aware that superchargers of the high speed centrifugal type and of other forms of pumps have been used heretofore both to supply air to the carbureter and positioned in the inlet passages between the carbureter and the inlet valves. In both arrangements such superchargers simply increase the air or fuel mixture pressure in the manifold supplying all the cylinders of the engine. Such superchargers, especially the centrifugal type, are of slight effect at low engine speeds so that they are of relatively slight assistance in increasing the power of an automotive engine when pulling at slow speed with wide open throttle. Such superchargers are also necessarily of relatively large size because of the necessity of handling the entire volume of air entering the engine. It is accordingly an object of this invention to provide a supercharger providing definite volumes of air for each individual cylinder at any speed of the engine, such supercharging being preferably supplemental to the normal fuel and air mixture drawn in through the inlet valves by the suction of the engine piston in the case of four stroke cycle engines.

It is also an object of this invention to provide a scavenging pump having individual pumping compartments, each of which supplies both scavenging and supercharging air to individual cylinders at timed intervals.

It is another object of this invention to provide a supercharging pump having separate compartments delivering to the different cylinders of an engine through ports in the wall of said pump which align with delivery passages leading to individual cylinders at predetermined periods in the cycle of events therein.

On the drawings:

Figure 1 is a vertical cross section of a double sleeve valve engine incorporating a supercharger embodying the preferred form of this invention.

Figure 2 is an elevation partly in section taken on the line II—II of Figure 1, showing the exhaust side of the engine and supercharger.

Figure 3 is a longitudinal section of the supercharger taken on the line III—III of Figure 1, with parts in elevation.

Figure 4 is a section on the line IV—IV of Figure 3.

Figure 5 is a section on the line V—V of Figure 4, with parts in elevation.

Figure 6 is a section partly in elevation of a modified form of supercharger driving mechanism.

Figure 7 is a left hand side view thereof with the gear cover removed.

Figure 8 is a section on the line VIII—VIII of Figure 1.

Figures 9 to 13 inclusive are sections at different stages of the cycle of operations, Figure 9 showing the exhaust closing and intake opening point; Figure 10 shows the intake closing and supercharger opening point; Figure 11 shows the supercharger cut off by the upward movement of the piston; Figure 12 discloses the exhaust opening point, and Figure 13 shows the small port opening which allows the supercharger to act as a scavenging pump during a portion of the upward travel of the piston on the exhaust stroke.

Figure 14 is a conventional valve opening diagram for a complete cycle, the supercharging and scavenging periods being indicated by cross hatching.

Figure 15 discloses a slightly modified form of the invention as adapted for use with poppet valve engines.

Figure 16 is a vertical cross section of another modification as applied to a two cycle engine.

Figure 17 is a longitudinal section with parts in elevation, corresponding with Figure 16.

Figure 18 is a section through the rotor of the supercharger, showing one partition blade in elevation.

As shown on the drawings:

The double sleeve or Knight type engine chosen for illustration in Figures 1 to 13 needs only a brief description as the structure follows the usual practice up to the inclusion of the supercharger pump. Such a Knight engine comprises a cylinder block 20 having a pair of concentric sleeves 21 and 22 reciprocable in the cylinder bore 23, the usual piston 24 reciprocating within the inner sleeve 21, and being operated by a connecting rod 25 from the crankshaft 26. The two sleeves 21 and 22 are reciprocated by small connecting rods 27 and 28 on an eccentric or cam shaft 29. Exhaust ports 30 and intake ports 31 are controlled by ports 32 in the sleeves which open and close communication with the combustion space inside the sleeves and above the piston. The operating cycle of such an engine is well known and can be conventionally illustrated by the solid line valve timing diagram shown in Figure 14.

The supercharger is built into the crank case 33 of the engine, a cylindrical casing 34 being formed therein parallel to the crankshaft and having individual passages 35 leading to double ports 36 in the walls of the sleeves near the bottom of the combustion chamber when the piston is near the bottom of its stroke. The double ports in the sleeves provide double area ports for the supercharging while only one pair of ports are aligned when scavenging air is being introduced at the start of the upward movement of the piston on its exhaust stroke. The supercharger pump comprises an outer sleeve 37 journaled in the cylindrical casing 34 and an inner rotor 38 on a shaft 39 eccentrically mounted in regard to the sleeve, the sleeve and rotor being connected by a number of vanes 40 pivotally attached to the inner face of the sleeve and sliding between semi-circular seals 41 journaled in the rotor to form rocker bearings, both the sleeve and rotor revolving together, the eccentricity of the rotor forming individual pumping compartments between each two of the vanes. Each compartment of the three-lobed pump supplies two cylinders of a six cylinder engine through ports 42 in the wall of the sleeve 37, the sleeve rotating at crankshaft speed while each cylinder fires at every other revolution, so that the ports 42 for two cylinders simultaneously align with the passages 35 for these cylinders, one cylinder receiving a supercharge through double ports while the other cylinder receives a proportionately reduced scavenging charge due to the reduced area of a single port through the two sleeves 21 and 22.

As previously stated, the supercharger rotates at crankshaft speed in the preferred form. Two methods of driving the sleeve 37 and rotor 38 are shown in Figures 3 to 7 inclusive. In Figures 3 to 5, the rotor shaft 39 is driven by a chain from the crankshaft (not shown), a chain sprocket 43 being mounted on the shaft 39. This chain sprocket 43 is provided with internal gear teeth 44 on its inner face which mesh with pinions 45 rotating on shaft 46 fixed in a stationary hub 47 on a line bisecting the axes of the sleeve and rotor. A second internal gear 48 carried by the sleeve meshes with these pinions which are thus located adjacent the intersection of the two internal gears, each of which is equally and oppositely offset relative to the pinions 45 so that each gear rotates about its own axis at the same speed. This same result is obtained by the structure of Figures 6 and 7 wherein external gears 49 and 50 on the shaft and sleeve respectively mesh with the equivalent of a single external pinion 51 located in the same manner as previously described. In both forms of the drive the sleeve is mounted on ball bearings 52 and is provided with end seals 53 forming part of the bearing housings, these seals extending inwardly to contact the ends of the rotor, thus forming the end closures of the pumping chambers.

In operation, the Knight type engine provided with a supercharger embodying the features of this invention functions normally as regards the exhaust and intake ports. Figure 9 shows that the exhaust ports are closed and the intake ports opened simultaneously slightly past the piston top dead center, the piston moving downwardly on its intake stroke. The intake period is completed by the closure of the intake ports considerably past the lower dead center to take advantage of the inertia of the inflowing fuel and air mixture, the double ports 36 in the sleeves being fully open when the supercharger port 42 opens into the passage 35 as shown in Figure 10. Supercharging with pure air continues until the upward movement of the piston covers the sleeve ports 36 as shown in Figure 11. This supercharging period is indicated by the cross-hatched area A in the valve timing diagram Figure 14. This supercharging period is superimposed on the first part of the compression stroke and serves to bring the volumetric efficiency of the engine above 100%. The additional air supplied at this time is mixed by the act of compression with the overrich fuel and air mixture which previously entered through the intake port, the whole charge being fired in the usual manner. The exhaust valve opens somewhat above bottom center on the combustion stroke, as shown in Figure 12, the exhaust gas back-pressure dropping rapidly until the supercharger again comes into action to supply scavenging air. This scavenging air tends to remain stratified immediately adjacent the piston head both because it is introduced through ports extending over a wide area of the cylinder wall and because of the lack of compressive action on the exhaust gases as they are pushed out of the exhaust port by the rising piston, so that the combustion space above the piston at top dead center is largely filled by the fresh scavenging air, resulting in a further increase in power output as compared to the usual case wherein the combustion chamber would be filled with spent exhaust gases when the exhaust valve closes.

Figure 15 illustrates the application of the supercharger of this invention to a poppet valve engine comprising an L head cylinder 54 with a piston 55, crankshaft 56, connecting rods 57, camshaft 58 and valves 59 actuated thereby. The normal valve timing diagram of Figure 14 is equally applicable to this type of engine. In this case, a six-lobed rotor 60 and sleeve 61 is used for a six cylinder engine and forms the supercharging and scavenging pump which is driven at half speed from the crankshaft. A three-lobed pump driven at crankshaft speed could be used as in the Knight engine if so desired. Supercharging and scavenging takes place in the same way as previously described with the exception that the cylinder wall port 62 is controlled by the piston while the ports 42 in the pump sleeve control the opening period for both charges.

A modified form of operation is involved in the two-stroke cycle type of engine illustrated in Figures 16 and 17. In this form, exhaust ports 63 are provided in the wall of the cylinder 64 in a position to be uncovered by the piston 65 near the bottom of its stroke. The supercharger pump 66, which has four vanes in the case of a four cylinder engine, is mounted above the cylinders and receives the proper mixture of fuel and air through an inlet passage 67 which connects to the usual carburetor.

The sleeve 68 of the pump 66 is provided with ports 42 as before, these ports opening into a neck 69 connecting to the cylinder and having a back pressure valve 70 seated therein to relieve the pump of the explosion pressures and temperatures in the engine cylinder. This valve is automatic in action and opens whenever the pump pressure exceeds the pressure in the engine cylinder, thus preventing dilution of the fresh charge due to unduly early opening of the pump ports 42.

In the operation of this form of two cycle engine, the supercharger starts to discharge into the cylinder soon after the exhaust ports are uncovered by the downward movement of the piston, the incoming fresh gases tending to push the exhaust gases out through the ports and thus acting to rapidly scavenge the cylinders. The piston on its return stroke covers the exhaust ports after which the final state of the delivery of the pump serves to supercharge the cylinder. This supercharging stops as soon as the compression pressure is sufficient to close the valve 70 so the space above the valve is not part of the clearance volume of the engine cylinder.

It will thus be seen that I have produced an improved type of supercharger pump for internal combustion engines which delivers a predetermined volume of air in predetermined relationship to the cycle of operation thereof as a supplement to the normal fuel and air mixture supply in the case of a four stroke cycle engine, such charges of air being preferably provided each revolution so that alternate charges supply scavenging and supercharging air.

I am aware that numerous changes may be made, and numerous details of construction may be varied through a wide range without departing from the principles of this invention, and I therefore do not purpose limiting the patent granted hereon, otherwise than necessitated by the prior art.

I claim as my invention:

1. A supercharging pump for internal combustion engines comprising an eccentric rotor and a cylinder each revolving at the same speed, vanes connecting said rotor and cylinder, said vanes defining separate chambers, ports in the wall of said cylinder for charging and discharging said compartments, and individual passages for each cylinder of the engine positioned to be uncovered by said ports at predetermined periods of the cycle of operation in each cylinder.

2. A supercharging and scavenging pump for internal combustion engines comprising an eccentric rotor and a cylinder, each revolving at the same speed, vanes connecting said rotor and cylinder, said vanes defining separate chambers, ports in the wall of said cylinder for charging and discharging said compartments, and individual passages for each cylinder of the engine positioned to be uncovered by ports at predetermined periods of the cycle of operation in each cylinder for alternately supercharging and scavenging said cylinders.

3. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor driving means for both the sleeve and the rotor operated in timed relationship to the crankshaft of the engine, passages from said housing to the individual cylinders of the engine, and ports in the sleeve adapted to register with said passages at predetermined intervals.

4. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor, driving means for said sleeve operated in timed relationship to the crankshaft of the engine, passages from said housing to the individual cylinders of the engine, and ports in the sleeve adapted to register with said passages at predetermined intervals.

5. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor, driving means co-ordinating the speed of both the sleeve and rotor and operated in timed relationship to the crankshaft of the engine, passages from said housing to the individual cylinders of the engine, and ports in the sleeve adapted to register with said passages at predetermined intervals.

6. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor, driving means for both the sleeve and the rotor operated in timed relationship to the crankshaft of the engine including means co-ordinating the speed of the eccentrically mounted rotor with the speed of the sleeve, passages from said housing to the individual cylinders of the engine, and ports in the sleeve adapted to register with said passages at predetermined intervals.

7. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor, driving means for said sleeve operated in timed relationship to the crankshaft of the engine including means co-ordinating the speed of the eccentrically mounted rotor with the speed of the sleeve, passages from said housing to the individual cylinders of the engine, and ports in the sleeve adapted to register with said passages at predetermined intervals.

8. A supercharger pump for multi-cylinder internal combustion engines comprising a cylindrical housing positioned parallel to the crankshaft of the engine, a cylindrical sleeve rotatable in said housing, a rotor eccentrically mounted within said sleeve, vanes connecting the sleeve and rotor driving means comprising gears carried by the sleeve and rotor and a pinion meshing with both of said gears, one of said gears being operated in timed relationship to the crankshaft of the engine, passages from said housing to the individual cylinders of the engine, and ports in the sleeve adapted to register with said passages at predetermined intervals.

9. A supercharger pump for multi-cylinder engines comprising a multi-vane type of rotary pump, means for driving said pump in fixed relationship to the crankshaft of the engine, individual passages from said pump to each cylinder and individual outlets from each compartment between adjacent vanes of the pump communicating with said passages whereby each compartment supplies a separate charge for individual cylinders of the engine.

10. A supercharger pump for multi-cylinder engines comprising a multi-vane type of rotary pump having the same number of compartments as engine cylinders, means for driving said pump at the crankshaft speed of the engine, individual passages from said pump to each cylinder and individual outlets from each compartment between adjacent vanes of the pump communicating with said passages whereby each compartment supplies a separate charge for individual cylinders of said engine once each revolution alternate charges providing scavenging and supercharging for a four stroke cycle engine.

11. A supercharger pump for multi-cylinder engines comprising a multi-vane type of rotating cylinder and eccentric rotor pump, means for driving said pump in fixed relationship to the crankshaft of the engine, individual passages from said pump to each cylinder and individual outlets from each compartment between adjacent vanes of the pump communicating with said passages whereby each compartment supplies a separate charge for individual cylinders of said engine.

12. A supercharger pump for multi-cylinder engines comprising a multi-vane type of rotating cylinder and eccentric rotor pump, means comprising gears on said cylinder and rotor meshing with a common pinion for driving the elements of said pump in fixed relationship to the crankshaft of the engine, individual passages from said pump to each cylinder and individual outlets from each compartment between adjacent vanes of the pump communicating with said passages whereby each compartment supplies a separate charge for individual cylinders of said engine.

13. A supercharger pump for multi-cylinder engines comprising a multi-vane type of rotating cylinder and eccentric rotor pump having the same number of compartments as engine cylinders, means for driving said pump at the crankshaft speed of the engine, and individual passages from said pump to each cylinder whereby each compartment between adjacent vanes of the pump supplies a separate charge for individual cylinders of said engine once each revolution, alternate charges providing scavenging and supercharging for a four stroke cycle engine.

14. A supercharger pump for multi-cylinder engines comprising a multi-vane type of rotating cylinder and eccentric rotor pump having the same number of compartments as engine cylinders, means comprising gears on said cylinder and rotor meshing with a common pinion for driving the elements of said pump at the crankshaft speed of the engine, and individual passages from said pump to each cylinder whereby each compartment between adjacent vanes of the pump supplies a separate charge for individual cylinders of said engine once each revolution alternate charges providing scavenging and supercharging for a four stroke cycle engine.

15. The combination with a multi-cylinder internal combustion engine, of a supercharging pump comprising a positive displacement type of rotary pump having separate compartments for supplying individual cylinders of the engine, and means for timing the delivery of the separate compartments to the individual cylinders.

16. The combination with a multi-cylinder internal combustion engine, of a supercharging pump comprising a positive displacement type of rotary pump having separate compartments for supplying individual cylinders of the engine, and means associated with the pump for alternately discharging supercharging air and scavenging air to individual cylinders in timed relationship to the cycle of operations in the cylinder.

17. The combination with a multi-cylinder internal combustion engine, of a supercharging pump supplementing the normal induction system of the engine comprising a positive displacement type of rotary pump having separate compartments for supplying individual cylinders of the engine, and means for timing the delivery of the separate compartments to the individual cylinders.

In testimony whereof I have hereunto subscribed my name at Lansing, Ingham County, Michigan.

JOHN T. TRUMBLE.